(12) United States Patent
Sato

(10) Patent No.: US 11,308,271 B2
(45) Date of Patent: Apr. 19, 2022

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Chihiro Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 153 days.

(21) Appl. No.: 16/458,204

(22) Filed: Jul. 1, 2019

(65) Prior Publication Data
US 2020/0019591 A1  Jan. 16, 2020

(30) Foreign Application Priority Data
Jul. 10, 2018 (JP) .............................. JP2018-130829

(51) Int. Cl.
*G06F 40/194*  (2020.01)
*G06K 9/00*  (2006.01)
(Continued)

(52) U.S. Cl.
CPC .......... *G06F 40/194* (2020.01); *G06F 40/226* (2020.01); *G06K 9/00483* (2013.01);
(Continued)

(58) Field of Classification Search
CPC . G06F 40/194; G06F 40/226; G06K 9/00483; G06K 9/00442; G06K 2209/01; G06K 9/38
See application file for complete search history.

(56) References Cited

U.S. PATENT DOCUMENTS

| 7,065,716 B1* | 6/2006 | Rzepkowski | ...... H04N 1/00236 |
| | | | 358/442 |
| 2008/0100880 A1* | 5/2008 | Matsunoshita | .... H04N 1/32149 |
| | | | 358/471 |

(Continued)

FOREIGN PATENT DOCUMENTS

JP  2016178568  10/2016

OTHER PUBLICATIONS

"Office Action of Japan Counterpart Application" with English translation thereof, dated Feb. 8, 2022, p. 1-p. 5.

*Primary Examiner* — Quoc A Tran
(74) *Attorney, Agent, or Firm* — JCIPRNET

(57) ABSTRACT

An information processing apparatus includes a generation part that generates plural documents of different quality from an input document input in a process in accordance with each of plural attribute values in a case where the plural attribute values designating quality of a document to be generated by the process are set for an attribute regulating operation of the process included in a preset process procedure, a control part that performs a control for retaining the plural documents generated by the generation part in a storage device, and an output part that outputs any one document as a representative document among the plural documents generated by the generation part and, in a case where an output request for a document different from the output document is received, outputs a document having quality designated by the output request among the plural documents retained in the storage device by the control part.

18 Claims, 11 Drawing Sheets

| PRIORITY LEVEL | NOISE REMOVAL | ANALYSIS PREPROCESSING | ANALYSIS ACCURACY |
|---|---|---|---|
| 1 | NORMAL | PERFORM | SPEED PRIORITY |
| 2 | NORMAL | PERFORM | RECOGNITION RATIO PRIORITY |
| 3 | NORMAL | DO NOT PERFORM | SPEED PRIORITY |
| 4 | NORMAL | DO NOT PERFORM | RECOGNITION RATIO PRIORITY |
| 5 | STRONG | PERFORM | SPEED PRIORITY |
| 6 | STRONG | PERFORM | RECOGNITION RATIO PRIORITY |
| 7 | STRONG | DO NOT PERFORM | SPEED PRIORITY |
| 8 | STRONG | DO NOT PERFORM | RECOGNITION RATIO PRIORITY |
| 9 | WEAK | PERFORM | SPEED PRIORITY |
| 10 | WEAK | PERFORM | RECOGNITION RATIO PRIORITY |
| 11 | WEAK | DO NOT PERFORM | SPEED PRIORITY |
| 12 | WEAK | DO NOT PERFORM | RECOGNITION RATIO PRIORITY |

(51) Int. Cl.
*G06F 40/226* (2020.01)
*G06K 9/38* (2006.01)
*G06F 17/00* (2019.01)

(52) U.S. Cl.
CPC .......... *G06K 9/00442* (2013.01); *G06K 9/38* (2013.01); *G06K 2209/01* (2013.01)

(56) References Cited

U.S. PATENT DOCUMENTS

| 2009/0185204 A1* | 7/2009 | Wu | H04N 1/60 |
| | | | 358/1.9 |
| 2017/0163826 A1* | 6/2017 | Nakazawa | H04N 1/00482 |
| 2018/0146105 A1* | 5/2018 | Saito | H04N 1/00196 |

* cited by examiner

FIG. 3

| FLOW DEFINITION ID | PLUG-IN | PARAMETER NAME | PARAMETER VALUE | | |
|---|---|---|---|---|---|
| | | | FIRST PRIORITY LEVEL | SECOND PRIORITY LEVEL | THIRD PRIORITY LEVEL |
| 0001 | OCR PROCESS | NOISE REMOVAL | NORMAL | STRONG | WEAK |
| | | ANALYSIS PREPROCESSING | PERFORM | DO NOT PERFORM | – |
| | | ANALYSIS ACCURACY | SPEED PRIORITY | RECOGNITION RATIO PRIORITY | – |
| | BARCODE READING PROCESS | NOISE REMOVAL | WEAK | NORMAL | STRONG |
| | | ANALYSIS ACCURACY | RECOGNITION RATIO PRIORITY | SPEED PRIORITY | – |
| | BLANK DETERMINATION PROCESS | BLANK DETERMINATION EXCLUSION AREA | 5 mm | 10 mm | 15 mm |
| 0002 | ... | ... | ... | ... | ... |

FIG. 9

| PRIORITY LEVEL | NOISE REMOVAL | ANALYSIS PREPROCESSING | ANALYSIS ACCURACY |
|---|---|---|---|
| 1 | NORMAL | PERFORM | SPEED PRIORITY |
| 2 | NORMAL | PERFORM | RECOGNITION RATIO PRIORITY |
| 3 | NORMAL | DO NOT PERFORM | SPEED PRIORITY |
| 4 | NORMAL | DO NOT PERFORM | RECOGNITION RATIO PRIORITY |
| 5 | STRONG | PERFORM | SPEED PRIORITY |
| 6 | STRONG | PERFORM | RECOGNITION RATIO PRIORITY |
| 7 | STRONG | DO NOT PERFORM | SPEED PRIORITY |
| 8 | STRONG | DO NOT PERFORM | RECOGNITION RATIO PRIORITY |
| 9 | WEAK | PERFORM | SPEED PRIORITY |
| 10 | WEAK | PERFORM | RECOGNITION RATIO PRIORITY |
| 11 | WEAK | DO NOT PERFORM | SPEED PRIORITY |
| 12 | WEAK | DO NOT PERFORM | RECOGNITION RATIO PRIORITY |

FIG. 10

| PRIORITY LEVEL | OCR PROCESS | | | QR CODE READING | | BLANK DETERMINATION |
|---|---|---|---|---|---|---|
| | NOISE REMOVAL | ANALYSIS PREPROCESSING | ANALYSIS ACCURACY | NOISE REMOVAL | ANALYSIS ACCURACY | BLANK DETERMINATION EXCLUSION AREA |
| 1 | NORMAL | PERFORM | SPEED PRIORITY | WEAK | RECOGNITION RATIO PRIORITY | 5 mm |
| 2 | NORMAL | PERFORM | SPEED PRIORITY | WEAK | RECOGNITION RATIO PRIORITY | 10 mm |
| 3 | NORMAL | PERFORM | SPEED PRIORITY | WEAK | RECOGNITION RATIO PRIORITY | 15 mm |
| 4 | NORMAL | PERFORM | SPEED PRIORITY | WEAK | SPEED PRIORITY | 5 mm |
| 5 | NORMAL | PERFORM | SPEED PRIORITY | WEAK | SPEED PRIORITY | 10 mm |
| 6 | NORMAL | PERFORM | SPEED PRIORITY | WEAK | SPEED PRIORITY | 15 mm |
| 7 | NORMAL | PERFORM | SPEED PRIORITY | NORMAL | RECOGNITION RATIO PRIORITY | 5 mm |
| 8 | NORMAL | PERFORM | SPEED PRIORITY | NORMAL | RECOGNITION RATIO PRIORITY | 10 mm |
| 9 | NORMAL | PERFORM | SPEED PRIORITY | NORMAL | RECOGNITION RATIO PRIORITY | 15 mm |
| 10 | NORMAL | PERFORM | SPEED PRIORITY | NORMAL | SPEED PRIORITY | 5 mm |
| 11 | NORMAL | PERFORM | SPEED PRIORITY | NORMAL | SPEED PRIORITY | 10 mm |
| 12 | NORMAL | PERFORM | SPEED PRIORITY | NORMAL | SPEED PRIORITY | 15 mm |
| 13 | NORMAL | PERFORM | SPEED PRIORITY | STRONG | RECOGNITION RATIO PRIORITY | 5 mm |
| 14 | NORMAL | PERFORM | SPEED PRIORITY | STRONG | RECOGNITION RATIO PRIORITY | 10 mm |
| 15 | NORMAL | PERFORM | SPEED PRIORITY | STRONG | RECOGNITION RATIO PRIORITY | 15 mm |
| 16 | NORMAL | PERFORM | SPEED PRIORITY | STRONG | SPEED PRIORITY | 5 mm |
| 17 | NORMAL | PERFORM | SPEED PRIORITY | STRONG | SPEED PRIORITY | 10 mm |
| 18 | NORMAL | PERFORM | SPEED PRIORITY | STRONG | SPEED PRIORITY | 15 mm |
| 19 | ... | ... | ... | ... | ... | ... |

FIG. 11

| GENERATION ORDER | DOCUMENT | NOISE REMOVAL |
|---|---|---|
| 1 | DOCUMENT 1 | NORMAL |
| 2 | DOCUMENT 2 | NORMAL |
| 3 | DOCUMENT 1 | STRONG |
| 4 | DOCUMENT 2 | STRONG |
| 5 | DOCUMENT 1 | WEAK |
| 6 | DOCUMENT 2 | WEAK |

FIG. 12

| GENERATION ORDER | DOCUMENT | NOISE REMOVAL |
|---|---|---|
| 1 | DOCUMENT 1 | NORMAL |
| 2 | DOCUMENT 1 | STRONG |
| 3 | DOCUMENT 1 | WEAK |
| 4 | DOCUMENT 2 | NORMAL |
| 5 | DOCUMENT 2 | STRONG |
| 6 | DOCUMENT 2 | WEAK |

FIG. 13

| GENERATION ORDER | DOCUMENT | NOISE REMOVAL |
|---|---|---|
| 1 | DOCUMENT 1 | WEAK |
| 2 | DOCUMENT 1 | STRONG |
| 3 | DOCUMENT 1 | NORMAL |
| 4 | DOCUMENT 2 | WEAK |
| 5 | DOCUMENT 2 | STRONG |
| 6 | DOCUMENT 2 | NORMAL |

FIG. 14

| GENERATION ORDER | DOCUMENT | NOISE REMOVAL |
|---|---|---|
| 1 | DOCUMENT 1 | WEAK |
| 2 | DOCUMENT 2 | WEAK |
| 3 | DOCUMENT 1 | NORMAL |
| 4 | DOCUMENT 2 | NORMAL |
| 5 | DOCUMENT 1 | STRONG |
| 6 | DOCUMENT 2 | STRONG |

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-130829 filed Jul. 10, 2018.

BACKGROUND

(i) Technical Field

The present invention relates to an information processing apparatus and a non-transitory computer readable medium storing an information processing program.

(ii) Related Art

JP2016-178568A discloses an information processing apparatus characterized by including a first acquisition section that acquires first setting information related to execution of a workflow in response to an operation performed by a user, a second acquisition section that acquires second setting information related to the user performing the operation from a holding section which holds the second setting information related to execution of the workflow in association with the user, a display section that displays a setting screen used for setting of the workflow based on the acquired first setting information and the second setting information, a control section that controls execution of the workflow in accordance with the setting of the workflow which is made using the setting screen, and a registration section that registers and holds the setting of the workflow in the holding section as the second setting information related to the user in a case where the setting of the workflow is changed by the user on the setting screen. The display section displays the first setting information for a setting item that is included in the first setting information acquired by the first acquisition section and is not changeable in the setting screen, and displays the second setting information fora setting item that is included in the first setting information acquired by the first acquisition section and is changeable in the setting screen, in a case where the second setting information including the setting item is acquired by the second acquisition section.

SUMMARY

In recent years, an information processing service for processing a document in accordance with a process procedure created by a user has drawn attention.

In the information processing service, a process such as noise removal is executed on the document in accordance with a predefined process procedure, and the processed document is delivered to a designated delivery destination apparatus.

In a case where the user feels that the document delivered to the delivery destination apparatus does not satisfy desired quality, the user may instruct a manager who manages the information processing service to change the setting of the process procedure to obtain the desired quality and may process the document again using the updated process procedure. In addition, depending on cases, the user may generate a document satisfying the desired quality by directly working on the document processed in the information processing service.

In a case where the document processed in accordance with the predefined process procedure does not satisfy the desired quality, a process of performing work or the like is performed again on the processed document, and effort is taken further than that in a case where the document satisfying the desired quality is obtained by performing a process once.

Aspects of non-limiting embodiments of the present disclosure relate to an information processing apparatus and a non-transitory computer readable medium storing an information processing program that provide a document satisfying requested quality without executing a process again even in a case where the quality of a document generated by execution of the process complying with a preset process procedure does not satisfy the requested quality.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a generation part that generates a plurality of documents of different quality from an input document input in a process in accordance with each of a plurality of attribute values in a case where the plurality of attribute values designating quality of a document to be generated by the process are set for an attribute regulating operation of the process included in a preset process procedure, a control part that performs a control for retaining the plurality of documents generated by the generation part in a storage device, and an output part that outputs any one document as a representative document among the plurality of documents generated by the generation part and, in a case where an output request for a document different from the output document is received, outputs a document having quality designated by the output request among the plurality of documents retained in the storage device by the control part.

BRIEF DESCRIPTION OF THE DRAWINGS

Exemplary embodiment(s) of the present invention will be described in detail based on the following figures, wherein:

FIG. 3 is a diagram illustrating one example of a flow definition;

FIG. 9 is a diagram illustrating one example of a process table;

FIG. 10 is a diagram illustrating another example of the process table;

FIG. 11 is a diagram illustrating one example (pattern 1) of a generation order of processed documents;

FIG. 12 is a diagram illustrating one example (pattern 2) of the generation order of the processed documents;

FIG. 13 is a diagram illustrating one example (pattern 3) of the generation order of the processed documents; and FIG. 14 is a diagram illustrating one example (pattern 4) of the generation order of the processed documents.

DETAILED DESCRIPTION

Hereinafter, the present exemplary embodiment will be described with reference to the drawings. Constituents and processes having the same functions will be designated by the same reference signs throughout all drawings, and descriptions of such constituents and processes will not be repeated.

Figure 1:
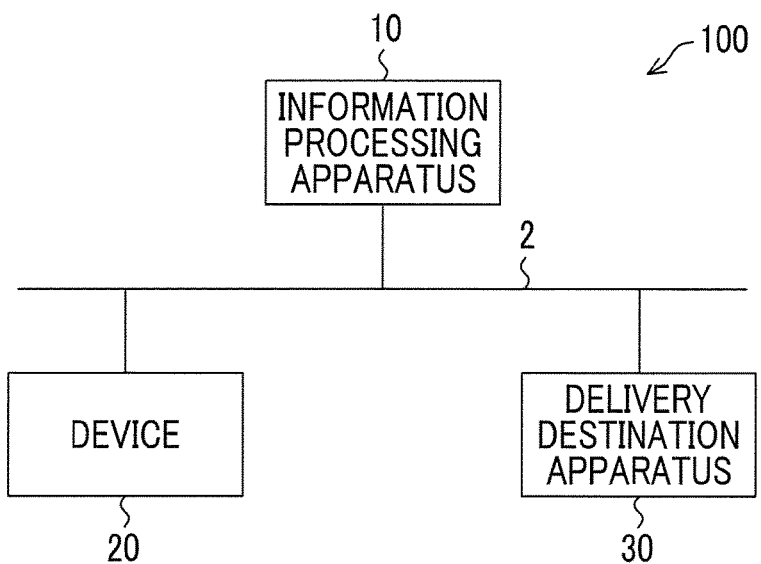
FIG. 1 is a diagram illustrating a configuration example of an information processing system.

FIG. 1 is a diagram illustrating a configuration example of an information processing system 100 according to the present exemplary embodiment. As illustrated in FIG. 1, the information processing system 100 includes an information processing apparatus 10, a device 20, and a delivery destination apparatus 30. Each of the information processing apparatus 10, the device 20, and the delivery destination apparatus 30 is connected to a communication line 2.

The information processing apparatus 10 is an apparatus that executes various processes defined in a preset process procedure on a document input from the device 20 in accordance with the process procedure. The information processing apparatus 10 transmits the document (hereinafter, referred to as a "processed document") processed by the information processing apparatus 10 to a transmission destination (in the example in FIG. 1, the delivery destination apparatus 30) that is designated by the process procedure.

The "document" generally refers to electronic data for notifying a person of any information. The document includes a text, a figure, a sign, an image, a video, an audio, and the like and also includes a property that represents arrangement information related to the text, the image, and the like and the characteristics of the document. The "property" represents information such as a file name for identifying the document and a creator and creation date and time of the created document that is used for managing the document.

The content of the process executed by the information processing apparatus 10 is not restricted and may be any process, provided that the process performs work such that any difference is made between the input document and the processed document. The process may be a process such as an enlarging and shrinking process, a color changing process, and a font changing process that affect the appearance of the document, and may also be a process such as addition of an electronic signature that does not affect the appearance of the document.

While the information processing apparatus 10 is a single apparatus in the example in FIG. 1, the information processing apparatus 10 may be constructed using cloud computing that is implemented by connecting a plurality of computers.

The device 20 is a device that provides a document to be acquired by the information processing apparatus 10. For example, a scan device that generates electronic data by optically reading the content of an original document set on a platen glass, or a storage device that stores a document received by a facsimile apparatus is used as the device 20.

The installation location of the device 20 is not restricted. The device 20 may be installed at a store or a public facility visited by an unspecified number of people or may be installed at a location such as a company or a school that only a person permitted in advance is allowed to enter.

The delivery destination apparatus 30 is an apparatus to which the processed document is delivered from the information processing apparatus 10. The delivery destination apparatus 30 is designated by the information processing apparatus 10. A storage device such as a file server, a mail server, and a facsimile apparatus are designated as the delivery destination apparatus 30. In a case where the delivery destination apparatus 30 is a storage device, the processed document delivered from the information processing apparatus 10 is stored in the delivery destination apparatus 30. In a case where the delivery destination apparatus 30 is a mail server, the processed document delivered from the information processing apparatus 10 is transmitted by mail to a reception destination that is designated by the process of the information processing apparatus 10. In a case where the delivery destination apparatus 30 is a facsimile apparatus, the processed document delivered from the information processing apparatus 10 is transmitted by fax to the reception destination that is designated by the process of the information processing apparatus 10.

The communication line 2 that connects the information processing apparatus 10, the device 20, and the delivery destination apparatus 30 may be a wireless line or a wired line and may be a dedicated line or a public line to which an unspecified number of apparatuses are connected.

While the example in FIG. 1 illustrates a case where the number of each of the information processing apparatus 10, the device 20, and the delivery destination apparatus 30 included in the information processing system 100 is one, the number of each apparatus is not restricted. For example, a plurality of devices 20 may be included.

Figure 2:
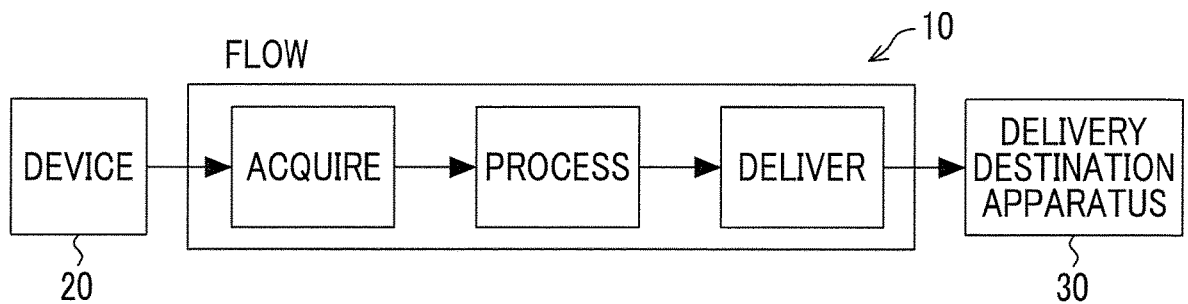
FIG. 2 is a diagram illustrating one example of flow processing in the information processing system.

FIG. 2 is a diagram illustrating one example of a course of processing information in the information processing system 100 and illustrates, for example, an example of processing the document acquired from the device 20 in accordance with a flow executed by the information processing apparatus 10 and transmitting processed information to the delivery destination apparatus 30. The "flow" is a series of processes complying with the preset process procedure.

For example, the process procedure is created by a manager of the information processing system 100, and the created process procedure is managed as a "flow definition" by the information processing apparatus 10. For example, the content of the process in each stage from the input to the output of the document to be processed in the information processing apparatus 10, the input-output destination of the document, the execution timing of the process, and a process order are defined in the process procedure. By executing the flow complying with the process procedure, the information processing apparatus 10 executes the process defined by the manager on the document received from the device 20.

As illustrated in FIG. 2, the flow includes an "acquisition process" of acquiring the document from the device 20 and a "processing process" of executing the process defined by the flow definition on the document acquired by the acquisition process. In addition, the flow includes a "delivery process" of delivering the processed document processed by the processing process to the delivery destination apparatus 30 defined by the flow definition.

Each process is implemented by a module called a "plug-in" that is prepared in advance for each content of process. That is, the manager defines the content of process by combining the plug-ins and generates a flow corresponding to a service content provided by the information processing apparatus 10.

In addition, in the flow definition, an allocation between the acquisition process and the device 20 from which the acquisition process acquires the document, and an allocation between the delivery process and the delivery destination apparatus 30 to which the processed document in the information processing apparatus 10 is delivered are defined.

FIG. 3 is a diagram illustrating one example of the created flow definition.

A flow definition ID is an identifier for uniquely identifying the content of the flow definition that is represented by the definition content.

As described above, the plug-in is a module that performs an individual process in the information processing apparatus 10. In the example in FIG. 3, plug-ins that perform an "OCR" process, a "barcode reading process", and a "blank determination process" are set.

The optical character recognition (OCR) process is a process of reading a text included in the document and converting the text into a text code. The barcode reading process is a process of reading the content of a barcode included in the document and acquiring information such as the creator of the document represented by the barcode. The blank determination process is a process of determining whether or not a blank document is included.

That is, in a flow that is represented by a flow definition ID of "0001", the "OCR process", the "barcode reading process", and the "blank determination process" are executed.

In addition to the plug-ins illustrated in FIG. 3, plug-ins corresponding to various processes are present in the information processing apparatus 10. For example, a folder input plug-in that acquires the document from a folder of a set apparatus, a rotation plug-in that rotates the document by a set angle, and a print output plug-in that transfers the processed document to an image forming apparatus and forms the processed document on a recording medium are present.

Each plug-in includes a parameter for regulating the operation of the process. The manager sets the quality of the process in the plug-in by appropriately setting the parameter value of the parameter. For example, the OCR process includes a parameter called "noise removal", and parameter values including "normal", "strong", and "weak" are prepared for the noise removal. The noise removal is a parameter for adjusting the strength of removal of a noise component included in the document. In the example in FIG. 3, the first priority level is set as "normal". The second priority level is set as "strong". The third priority level is set as "weak".

The priority level in FIG. 3 represents the priority level of each parameter value set for one parameter. For example, a decrease in the number of the priority level represents an increase in priority. That is, in the case of the noise removal in the OCR process, an increase in the priority of the parameter value is represented in an order of "normal">"strong">"weak".

In "analysis preprocessing" in the OCR process, "perform" and "do not perform" are set as the parameter value. For example, the analysis preprocessing is a parameter for setting whether or not to perform preprocessing such as inclination correction or resolution conversion in advance on the document in order to increase the reading accuracy of the text. In a setting field of the parameter value, "-" represents that the parameter value is not set.

In "analysis accuracy" in the OCR process, "speed priority" and "recognition ratio priority" are set as the parameter value. The analysis accuracy is a parameter for setting the reading characteristics of the text code.

In "noise removal" in the barcode reading process, "normal", "strong", and "weak" are set as the parameter value in the same manner as the "noise removal" in the OCR process. The noise removal in the barcode reading process is a parameter for adjusting the strength of removal of a noise component included in the barcode. In the case of the "noise removal" in the barcode reading process, the priority of the parameter value is set to be increased in an order of "weak">"normal">"strong".

In "analysis accuracy" in the barcode reading process, "speed priority" and "recognition ratio priority" are set as the parameter value in the same manner as the "analysis accuracy" in the OCR process. The "analysis accuracy" in the barcode reading process is a parameter for setting the reading characteristics of the barcode. In the case of the "analysis accuracy" in the barcode reading process, the priority of the parameter value is set to be increased in an order of "recognition ratio priority">"speed priority".

In a "blank determination exclusion area" in the blank determination, "5 mm", "10 mm", and "15 mm" are set as the parameter value. The blank determination exclusion area is a parameter for setting a threshold for regulating whether or not to determine that the document is blank. In a case where the parameter value of the blank determination exclusion area is set to "5 mm", it is determined that the document is not blank even in a case where a blank area having each edge of 5 mm or less is detected in the document.

The parameter for regulating the operation of the plug-in is one example of an attribute according to the exemplary embodiment. The parameter value for setting the quality of the document processed by the plug-in is one example of an attribute value according to the exemplary embodiment.

In FIG. 3, for example, the "noise removal" of the OCR process is set to have three parameter values. However, it is not meant that the "noise removal" of the OCR process has only three parameter values. It is meant that the manager sets three parameters of "normal", "strong", and "weak" with priority levels from three or more parameter values of the "noise removal" of the OCR process.

Regarding the setting of the parameter value, the same applies to the parameters other than the "noise removal" of the OCR process.

Figure 4:
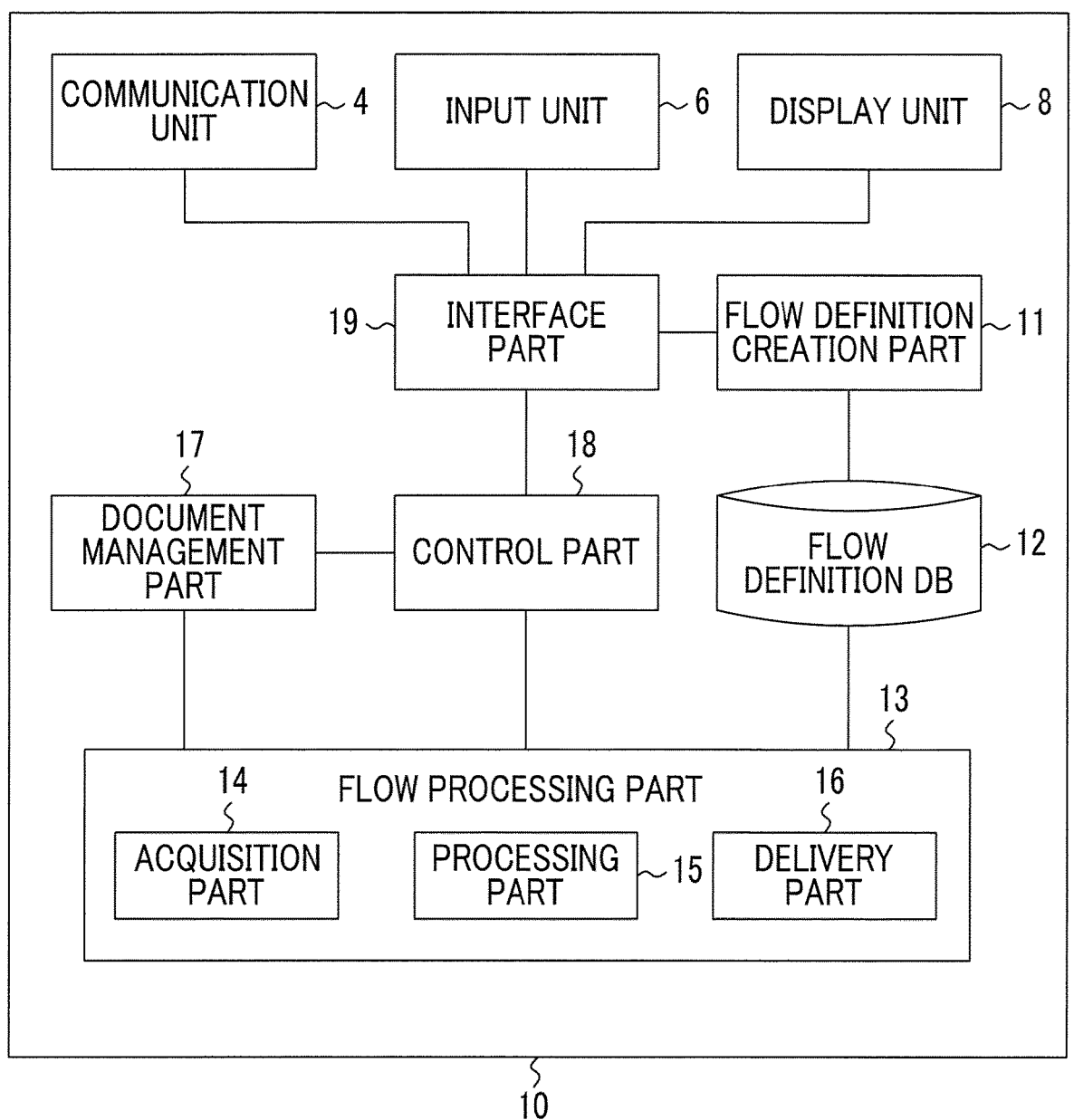
FIG. 4 is a diagram illustrating a functional configuration example in an information processing apparatus.

FIG. 4 is a diagram illustrating a functional configuration example in the information processing apparatus 10. For example, the information processing apparatus 10 includes function parts of a flow definition creation part 11, a flow definition DB 12, a flow processing part 13, a document management part 17, a control part 18, and an interface part 19. In addition, the flow processing part 13 includes function parts of an acquisition part 14, a processing part 15, and a delivery part 16. Furthermore, units of a communication unit 4, an input unit 6, and a display unit 8 are connected to the interface part 19.

The flow definition creation part 11 creates the flow definition in advance for processing the document in accordance with an instruction of the manager notified from the interface part 19 described below.

The flow definition creation part 11 displays a combination of the parameter of the plug-in used by the manager and the parameter value that the parameter may have on the display unit 8 and, for example, receives settings of the priority level of the parameter value and the parameter value for the parameter by selecting a radio button. For example, the parameter value and the priority level may be set by making a selection using a drop-down list and inputting a number in a text box.

The flow definition creation part 11 also sets the plug-in and the priority level of the parameter in accordance with an instruction of the manager.

In addition, considering a case where the manager is not sure which parameter value is to be set for the parameter, the flow definition creation part 11 may display a screen causing the manager to select a result, the state of the document, or the like to be obtained on the display unit 8 and may set the parameter value corresponding to a combination for the selected state. For example, in a case where the manager is not sure whether or not to perform the "analysis preprocessing" in the OCR process, the manager is caused to make a selection by displaying options such as "want to increase recognition ratio", "text included in document is small", and "text included in document is large" instead of causing the manager to select "perform" or "do not perform" for the "analysis preprocessing". Then, for example, in a case where "want to increase recognition ratio" and "text included in document is small" are selected, the flow definition creation part 11 determines that it is more favorable to perform preprocessing, and sets the parameter value of the "analysis preprocessing" to "perform".

The flow definition creation part 11 creates the flow definition illustrated in FIG. 3 by associating the created flow definition with the flow definition ID, and notifies the flow definition DB 12 of the flow definition.

The flow definition creation part 11 that sets each item constituting the flow definition is one example of a setting part according to the exemplary embodiment.

The flow definition DB 12 manages the flow definition created by the flow definition creation part 11. Here, "DB" is the abbreviation for database.

The "database" usually refers to an application that manages data in association with a preset master key. However, the "database" according to the exemplary embodiment does not refer to various commercial or non-commercial database application and represents a storage area that stores data. Apparently, the information processing apparatus 10 may use a database application for managing the storage area storing data (in this case, the flow definition).

In a case where the control part 18 receives a start-up instruction for the flow from the manager through the interface part 19, the control part 18 notifies the flow processing part 13 of the flow definition ID designated by the start-up instruction and instructs the flow processing part 13 to execute the flow that complies with the flow definition represented by the notified flow definition ID.

In a case where the flow processing part 13 receives the flow definition ID from the control part 18, the flow processing part 13 acquires the flow definition corresponding to the flow definition ID from the flow definition DB 12 and executes the process, that is, the flow, complying with the acquired flow definition. The flow processing part 13 includes the acquisition part 14 that executes the acquisition process in the flow, the processing part 15 that executes the processing process, and the delivery part 16 that executes the delivery process.

The acquisition part 14 monitors the device 20 defined in the flow definition acquired by the flow processing part 13 and acquires the document generated by the device 20. A plurality of flows may be executed by the flow processing part 13. Thus, in a case where the acquisition part 14 acquires the document, the acquisition part 14 generates a process ID that uniquely identifies the flow acquiring the document, and notifies the document management part 17 of the generated process ID and the acquired document.

The document management part 17 manages the process ID and the document received from the acquisition part 14 in association with each other.

In addition, the acquisition part 14 notifies the control part 18 of the generated process ID and the flow definition ID corresponding to the flow acquiring the document.

The control part 18 controls various processes executed by the information processing apparatus 10. In a case where the control part 18 receives the process ID and the flow definition ID from the acquisition part 14, the control part 18 manages the process ID and the flow definition ID in association with each other. Accordingly, the flow corresponding to the process ID is either executed by the flow processing part 13 in accordance with any flow definition or managed by the control part 18. In addition, the control part 18 notifies the processing part 15 of the process ID received from the acquisition part 14 and the flow definition ID that is managed in association with the process ID.

In a case where the processing part 15 receives the process ID from the control part 18, the processing part 15 acquires the document associated with the received process ID from the document management part 17. Accordingly, the document acquired by the acquisition part 14 is passed to the processing part 15. The processing part 15 executes the process on the acquired document in accordance with the content of the flow definition corresponding to the flow definition ID notified from the control part 18.

While detailed description will be provided below, the processing part 15 generates a plurality of documents, that is, the processed documents, of different quality represented by the parameter value in accordance with the priority level of the parameter value in the parameter of the plug-in, associates each generated processed document with the priority level, and notifies the document management part 17 of the processed document, the priority level, and the process ID. The processing part 15 is one example of a generation part according to the exemplary embodiment that generates a plurality of documents of different quality from the document acquired by the acquisition part 14.

In a case where the document management part 17 receives the processed document, the priority level, and the process ID from the processing part 15, the document management part 17 manages each processed document associated with the priority level for each process ID and stores the processed document in the storage device.

In addition, the processing part 15 passes any one processed document of the plurality of generated processed documents, the flow definition ID of the flow definition applied to the processed document, and the process ID to the delivery part 16.

In a case where the delivery part 16 receives the processed document, the flow definition ID, and the process ID from the processing part 15, the delivery part 16 delivers the processed document to which the process ID is attached to the delivery destination apparatus 30 defined by the flow definition corresponding to the received flow definition ID.

Among the plurality of processed documents generated from the same document along with the execution of the flow by the flow processing part 13, any one processed document that is transmitted to the delivery destination apparatus 30 earlier than the other processed documents is a document representing the plurality of processed documents and thus, is called a "representative document". The delivery part 16 that delivers the representative document to the delivery destination apparatus 30 defined by the flow definition is one example of an output part according to the exemplary embodiment.

The interface part 19 receives an instruction from the manager and a user of the information processing system 100 through the communication unit 4 and the input unit 6 and notifies the manager and the user of the information processing system 100 of information related to the received instruction through at least one of the communication unit 4 or the display unit 8.

The communication unit 4 is connected to the communication line 2 and includes a communication protocol for transmitting and receiving data with an information apparatus, not illustrated, that is operated by the user of the information processing system 100.

The input unit 6 is an input device that receives an instruction from the manager operating the information processing apparatus 10. For example, a button, a touch panel, a keyboard, and a mouse are used as the input unit 6.

The display unit 8 is a display device that displays information processed by the information processing apparatus 10 as an image. For example, a liquid crystal display or an organic electro luminescence (EL) display is used as the display unit 8.

Responses that are received by the interface part 19 include, for example, a document list instruction, a redelivery instruction, and confirmation notification.

For example, the document list instruction is a response for requesting confirmation of information related to the other documents of different quality generated from the document as a generation source of the representative document, that is, the same document as the document acquired by the acquisition part 14, in a case where the user of the information processing system 100 (hereinafter, simply referred to as the "user") that receives the representative document from the delivery destination apparatus 30 feels that the quality of the representative document is different from desired quality.

For example, in a case where the interface part 19 receives the document list instruction from the user through the communication unit 4, the interface part 19 notifies the control part 18 of the received document list instruction.

In a case where the control part 18 receives the document list instruction from the interface part 19, the control part 18, for example, acquires the process ID attached to the document list instruction and acquires a plurality of processed documents associated with the same process ID from the document management part 17. The control part 18 controls the interface part 19 to provide the user providing the document list instruction with a document list screen that includes, for example, the priority level and a thumbnail of each acquired processed document.

The redelivery instruction is a response for requesting redelivery of the document to the delivery destination apparatus 30 in a case where a document of quality desired by the user is present among the processed documents included in the document list screen. That is, the redelivery instruction is one example of an output request according to the exemplary embodiment.

In a case where the control part 18 receives the redelivery instruction from the interface part 19, the control part 18 acquires the designated processed document from the document management part 17 and notifies the delivery part 16 of the process ID of the designated processed document, the flow definition ID corresponding to the process ID, and the acquired processed document.

The delivery part 16 redelivers the processed document to which the process ID is attached to the delivery destination apparatus 30 defined by the flow definition corresponding to the received flow definition ID.

The confirmation notification is a response for notifying the information processing apparatus 10 that the delivered processed document satisfies the quality desired by the user.

Specifically, for example, in a case where the interface part 19 receives the confirmation notification from the user through the communication unit 4, the interface part 19 notifies the control part 18 of the received confirmation notification.

In a case where the control part 18 receives the confirmation notification from the interface part 19, the control part 18 acquires the process ID attached to the confirmation notification and deletes each processed document associated with the same process ID as the acquired process ID among the processed documents managed by the document management part 17.

Figure 5:
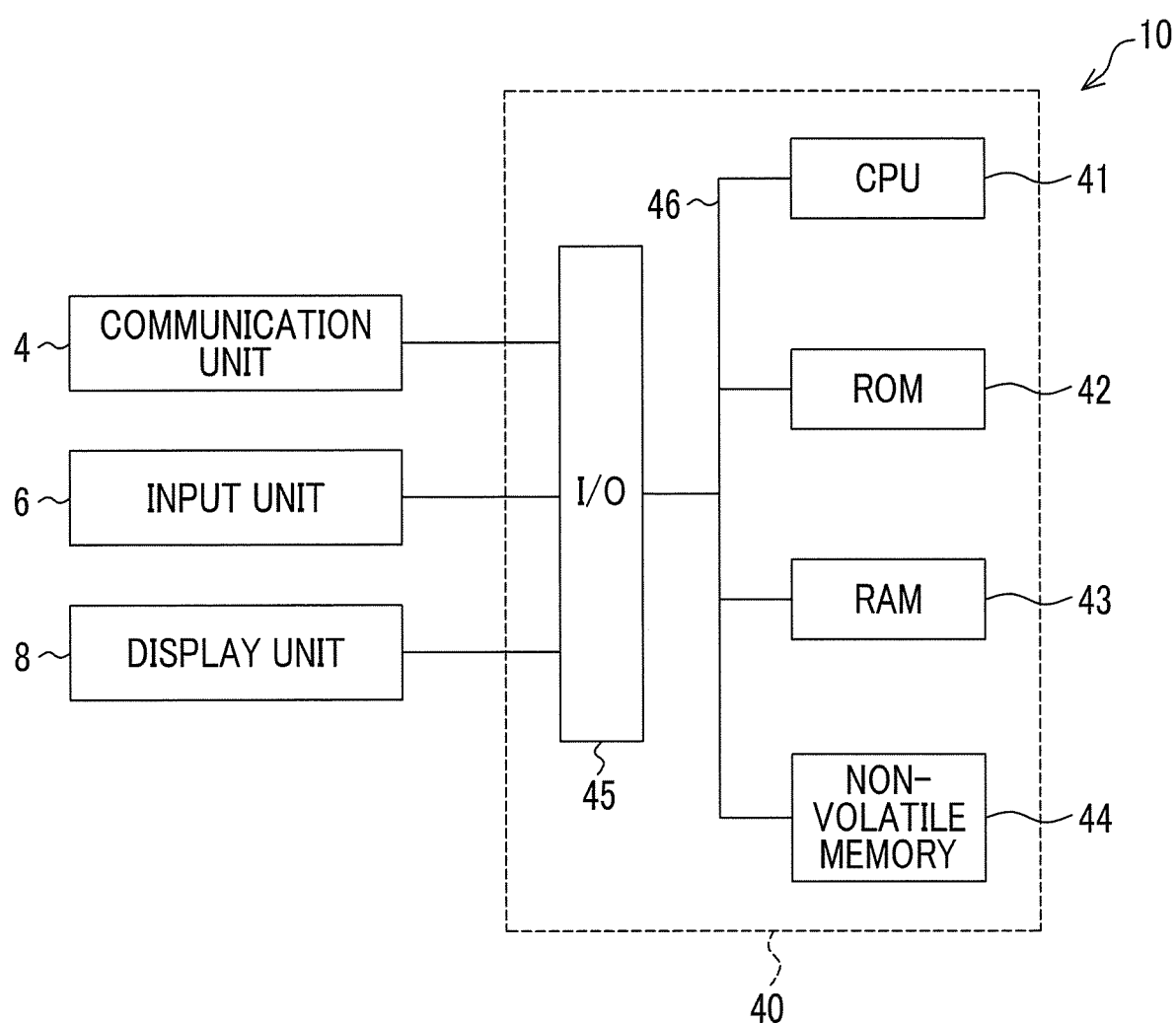
FIG. 5 is a diagram illustrating a main configuration example of an electrical system in the information processing apparatus.

Next, a main configuration example of an electrical system in the information processing apparatus 10 will be described using FIG. 5. As illustrated in FIG. 5, for example, the information processing apparatus 10 is configured using a computer 40.

The computer 40 includes a central processing unit (CPU) 41 that performs the function of each function part illustrated in FIG. 4, a read only memory (ROM) 42 that stores a program, a random access memory (RAM) 43 that is used as a temporary work area of the CPU 41, a non-volatile memory 44, and an input-output interface (I/O) 45. The CPU 41, the ROM 42, the RAM 43, the non-volatile memory 44, and the I/O 45 are connected to each other through a bus 46.

The non-volatile memory 44 is one example of a storage device that maintains stored data even in a case where electric power supplied to the non-volatile memory 44 is shut off. For example, a semiconductor memory is used as the non-volatile memory 44. A hard disk may also be used.

For example, the communication unit 4, the input unit 6, and the display unit 8 are connected to the I/O 45. Units connected to the I/O 45 are not limited to the units illustrated in FIG. 5. For example, another unit such as an image forming unit that forms the set flow definition on a recording medium such as paper may be connected to the I/O 45.

Next, the operation of the information processing apparatus 10 will be described in detail using FIG. 6.

Figure 6:
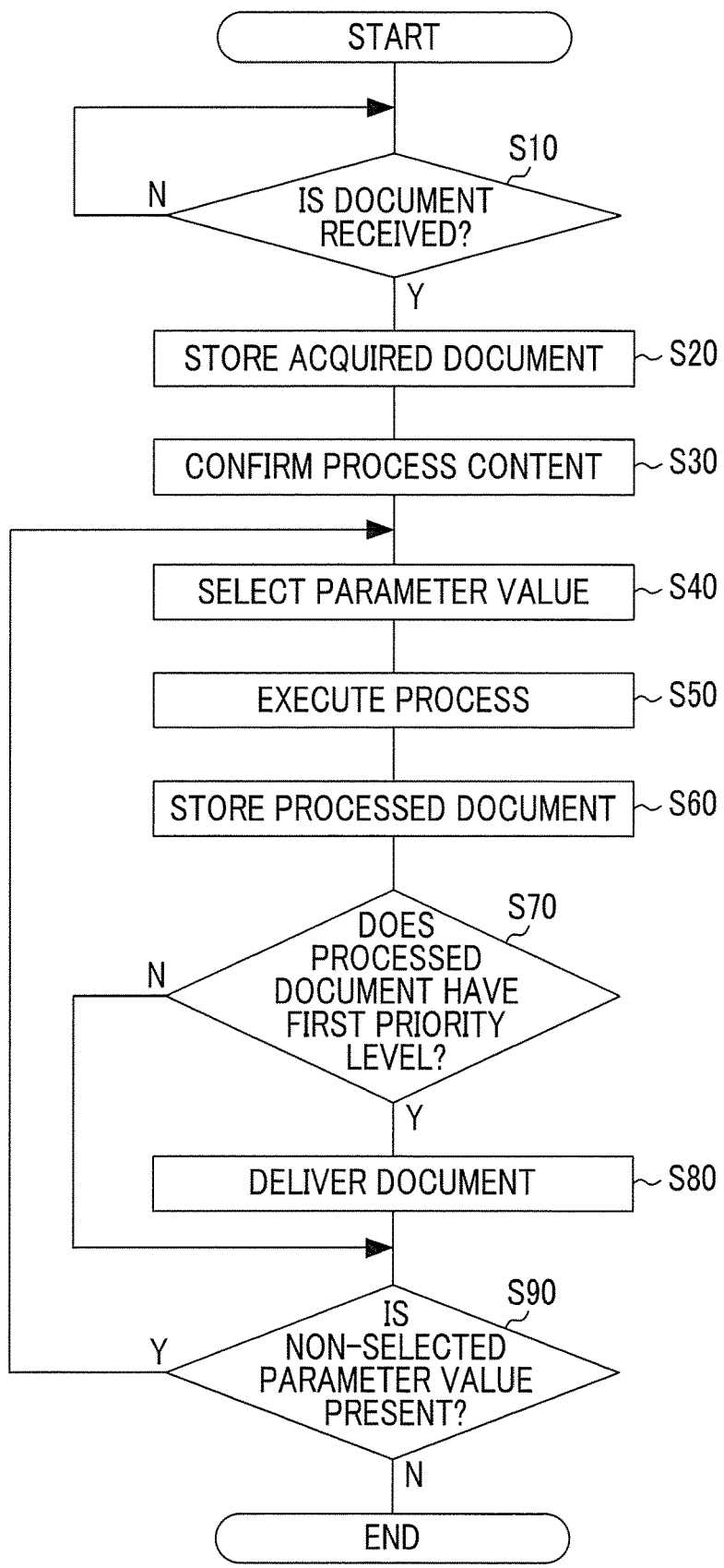
FIG. 6 is a flowchart illustrating one example of a flow of information processing executed after start-up.

FIG. 6 is a flowchart illustrating one example of a flow of information processing executed by the CPU 41 in a case where the information processing apparatus 10 is started up.

For example, an information processing program that regulates information processing is stored in advance in the ROM 42 of the information processing apparatus 10. The CPU of the information processing apparatus 10 reads the information processing program stored in the ROM 42 and executes information processing.

It is assumed that the flow definition is already created by the information processing apparatus 10 and is stored in the non-volatile memory 44 along with the flow definition ID. In addition, it is assumed that the information processing apparatus 10 is instructed to execute the flow complying with the created flow definition. For easy understanding of description, it is illustratively assumed that in the flow definition, one plug-in (for example, the OCR process) is defined as the process to be executed on the document by the processing part 15, and only a process of changing one parameter (for example, the "noise removal") among parameters included in the OCR process is defined. The priority level of each parameter value of the "noise removal" is the same as the priority level illustrated in FIG. 3.

First, in step S10, the CPU 41 determines whether or not a document is received from the device 20 defined in the flow definition. In a case where a document is not received, the determination process of step S10 is repeatedly executed, and the status of reception of a document is monitored. Meanwhile, in a case where a document is received, a transition is made to step S20. The document received in step S10 may be particularly referred to as an "input document".

In step S20, the CPU 41 generates the process ID corresponding to the flow and, for example, stores the generated process ID and the document acquired in step S10 in association with each other in the non-volatile memory 44.

In step S30, the CPU 41 confirms the process content to be executed on the document by referring to the flow definition associated with the flow definition ID using the flow definition ID associated with the flow being executed. In this case, an instruction to execute the "noise removal" of the OCR process is provided.

In step S40, the CPU 41 selects one parameter value for the process for which the instruction is provided in step S30. Specifically, the CPU 41 selects three parameter values of "normal", "strong", and "weak" set for the "noise removal" of the OCR process in accordance with their priority levels. Since the parameter value having the highest priority level among three parameter values is "normal", the CPU 41, for example, initially selects "normal".

In step S50, the CPU 41 executes the process for which the instruction is provided in step S30 in accordance with the parameter value selected in step S40. In this case, the "noise removal" of the OCR process is executed on the document at strength corresponding to "normal".

In step S60, the processed document on which the process complying with the flow definition is executed in step S50 is stored in the non-volatile memory 44 by the CPU 41 in association with the process ID generated in step S20 and the priority level of the parameter value selected in step S40.

In step S70, the CPU 41 determines whether or not the processed document stored in the non-volatile memory 44 in step S60 is the processed document associated with the first priority level. In a case where the processed document is associated with the first priority level, a transition is made to step S80. In the "noise removal" of the OCR process, the parameter value of "normal" has the first priority level, and thus, the processed document also has the first priority level. Thus, a transition is made to step S80.

In step S80, the CPU 41 delivers the processed document having the first priority level as the representative document to the delivery destination apparatus 30 defined in the flow definition represented by the flow definition ID associated with the flow being executed. That is, the processed document associated with the highest priority level is delivered to the user as the representative document. For example, the process ID corresponding to the flow is attached to the delivered representative document. For example, like the priority level of the parameter value, the priority level that is associated with the processed document based on the priority level defined in the flow definition is called the "priority level of the processed document".

Meanwhile, in a case where it is determined that the processed document is not associated with the first priority level in the determination process of step S70, a transition is made to step S90 without executing step S80.

In step S90, the CPU 41 determines whether or not a parameter value that is not selected in step S40 is present among the parameter values of the process for which the instruction is provided in step S30. In a case where a parameter value that is not selected is present, a transition is made to step S40. In step S40, the non-selected parameter value is selected in accordance with its priority level. In this case, "strong" that is set to have the second priority level is selected.

Accordingly, in step S50, the OCR process for which the strength of the noise removal is set to "strong" is executed on the input document. In step S60, the processed document for which the parameter value corresponds to "strong" is stored in the non-volatile memory 44 in association with the process ID and the priority level. The processed document for which the parameter value corresponds to "strong" is not the processed document having the first priority level and thus, is not delivered to the delivery destination apparatus 30, and the subsequent non-selected parameter value is selected.

That is, by repeating the processes of steps S40 to S90 until the parameter value not selected in step S40 is not present, a plurality of processed documents of different quality corresponding to the number of parameter values set in the flow definition are generated and stored in the non-volatile memory 44. That is, a plurality of processed documents having different quality are stored in the non-volatile memory 44 for each flow. Then, the processed document having the highest priority level is delivered to the user as the representative document.

In a case where it is determined that all parameter values of the process for which the instruction is provided in step S30 are selected in the determination process of step S90, the information processing illustrated in FIG. 6 is finished.

While a selection is made in order from the parameter value having the highest priority level in step S40, for example, a selection may be made in order from the parameter value having the lowest priority level during the process for which the instruction is provided. That is, the parameter values may be selected in an order of "weak", "strong", and "normal". In this case, the processed document corresponding to each parameter value is stored in the non-volatile memory 44, and then, the representative document is delivered to the delivery destination apparatus 30.

In addition, while the processed document having the highest priority level is set as the representative document in the information processing illustrated in FIG. 6, the processed document having the lowest priority level may be set as the representative document. Furthermore, the information processing apparatus 10 may deliver any one processed document of the processed documents generated using each parameter value as the representative document to the delivery destination apparatus 30 regardless of the priority level of the processed document.

In addition, a plurality of processed documents such as the processed documents having the first and second priority level may be delivered to the delivery destination apparatus as the representative document. The number of representative documents to be delivered is set by the flow definition.

Next, a process in a case where a response to the representative document is received from the user who receives the representative document delivered to the delivery destination apparatus 30 from the information processing apparatus 10 will be described.

Figure 7:
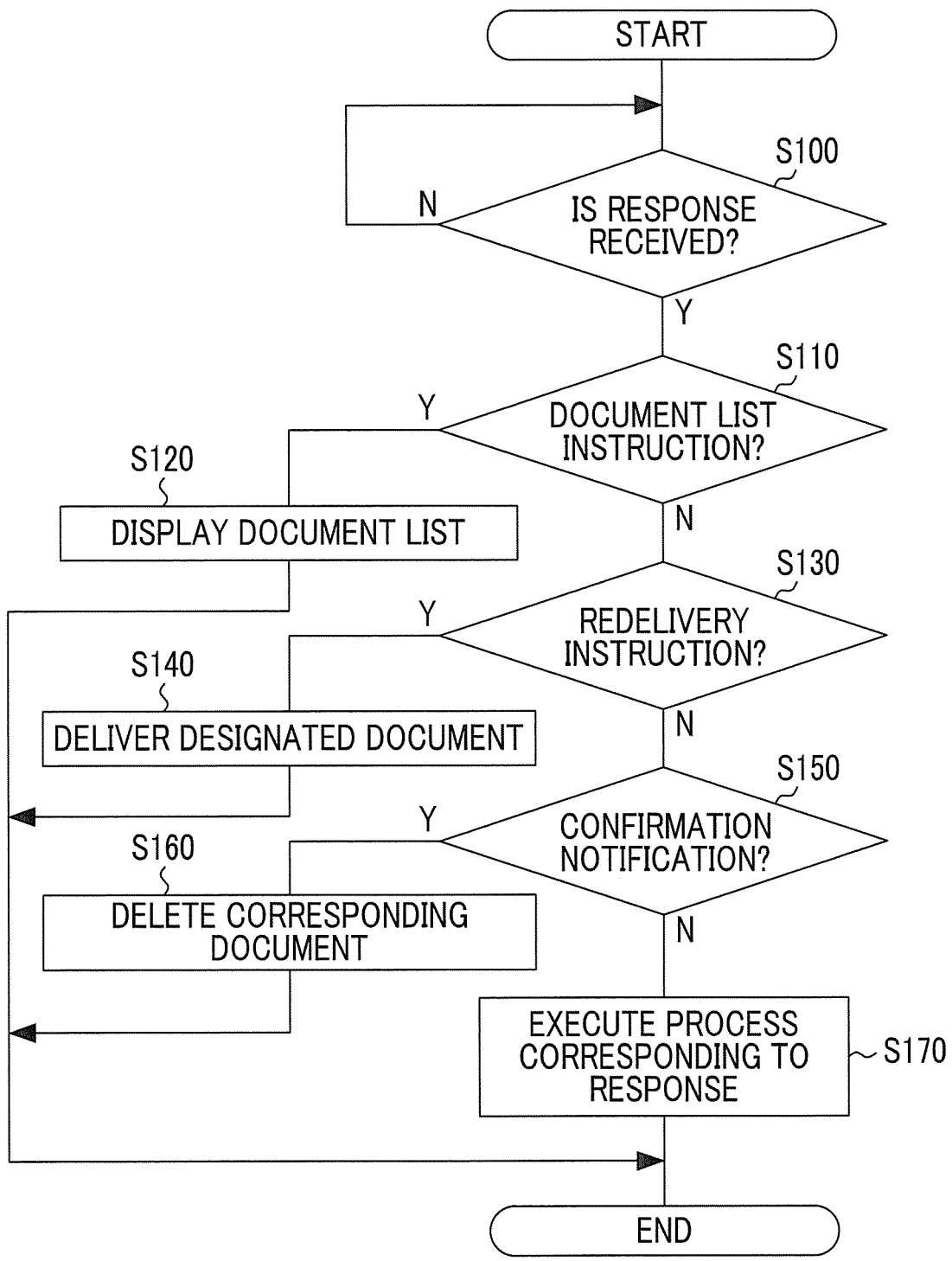
FIG. 7 is a flowchart illustrating one example of a flow of information processing executed in a case where a response is received.

FIG. 7 is a flowchart illustrating one example of a flow of information processing executed by the CPU 41 in a case where the information processing apparatus 10 receives a response to the representative document from the user. The information processing apparatus 10 receives the response from the information apparatus, not illustrated, that is connected to the communication line 2 and is operated by the user.

First, in step S100, the CPU 41 determines whether or not a response of the user is received through the communication unit 4. In a case where a response is not received, the determination process of step S100 is repeatedly executed, and a response is monitored. Meanwhile, in a case where a response is received, a transition is made to step S110. It is assumed that the same process ID as the process ID attached to the representative document is attached to the response.

In step S110, the CPU 41 determines whether or not the response received in step S100 is the document list instruction. In a case where the response is the document list instruction, a transition is made to step S120.

In step S120, the CPU 41 acquires the process ID attached to the document list instruction and acquires a plurality of processed documents associated with the same process ID as the process ID attached to the document list instruction from the non-volatile memory 44. The CPU 41 generates the document list screen on which the plurality of acquired processed documents are displayed in a list form, controls the communication unit to transmit the generated document list screen to the information apparatus that transmits the document list instruction, and finishes the information processing illustrated in FIG. 7.

An identifier that identifies the processed document, for example, the priority level associated with the processed document, is displayed in association with the processed document on the document list screen. Depending on a timing at which the information processing apparatus 10 receives the document list instruction, not all processed documents corresponding to each parameter value defined in the flow definition may be generated. In this case, for example, the CPU 41 may display the priority level of the non-generated processed document in association with a text string such as "being processed" and "not processed yet" on the document list screen.

The CPU 41 displays buttons such as a "reference" and "download" on the document list screen. In a case where the user presses the "reference" button, the information processing apparatus 10 is notified of a reference instruction. In a case where the "download" button is pressed, the information processing apparatus 10 is notified of a download instruction. The process ID that specifies the flow, and the priority level of the processed document to be referred to or downloaded are attached to each of the reference instruction and the download instruction.

Meanwhile, in a case where it is determined that the response is not the document list instruction in the determination process of step S110, a transition is made to step S130.

In step S130, the CPU 41 determines whether or not the response received in step S100 is the redelivery instruction. In a case where the response is the redelivery instruction, a transition is made to step S140.

In step S140, the CPU 41 acquires the process ID attached to the redelivery instruction and the identifier of the processed document that is designated by the redelivery instruction and is to be redelivered. For example, the priority level that is notified in the document list screen and is associated with the processed document is used as the identifier of the processed document. Other identifiers such as the file name of the processed document may also be used. The CPU 41 acquires the processed document corresponding to the acquired process ID and the priority level from the non-volatile memory 44. The CPU 41 delivers the acquired processed document to the delivery destination apparatus 30 defined by the flow definition corresponding to the flow definition ID associated with the process ID, and finishes the information processing illustrated in FIG. 7.

Meanwhile, in a case where it is determined that the response is not the redelivery instruction in the determination process of step S130, a transition is made to step S150.

In step S150, the CPU 41 determines whether or not the response received in step S100 is the confirmation notification. In a case where the response is the confirmation notification, a transition is made to step S160.

In a case where the confirmation notification is received, the user satisfies the quality of the processed document. Thus, the user does not further request the processed document of another quality generated by the same flow. Accordingly, in step S160, the CPU 41 acquires the process ID attached to the confirmation notification, deletes each processed document associated with the same process ID as the acquired process ID from the non-volatile memory 44, and finishes the information processing illustrated in FIG. 7.

Meanwhile, in a case where it is determined that the response is not the confirmation notification in the determination process of step S150, a transition is made to step S170.

In step S170, the CPU 41 executes the process corresponding to the content of the response received in step S100.

For example, in a case where the response is the reference instruction, the CPU 41 acquires the process ID and the priority level of the processed document attached to the reference instruction and acquires the processed document associated with the acquired process ID and the priority level from the non-volatile memory 44. The CPU 41 generates a reference screen on which the acquired processed document is displayed, controls the communication unit 4 to transmit the reference screen to the information apparatus that transmits the reference instruction, and finishes the information processing illustrated in FIG. 7. Accordingly, the processed document selected in the document list screen is displayed on the screen of the information apparatus operated by the user.

In addition, in a case where the response is the download instruction, the CPU 41 acquires the process ID and the priority level of the processed document attached to the download instruction and acquires the processed document associated with the acquired process ID and the priority level from the non-volatile memory 44. The CPU 41 controls the communication unit 4 to transmit the acquired processed document to the information apparatus that transmits the download instruction, and finishes the information processing illustrated in FIG. 7. Accordingly, the user obtains the processed document having different quality from the representative document using the information apparatus operated by the user.

In addition, in a case where the response is an acquisition instruction for acquiring the flow definition, the CPU 41 acquires the process ID attached to the acquisition instruction and specifies the flow definition ID associated with the acquired process ID. The CPU 41 acquires the flow definition associated with the specified flow definition ID from the non-volatile memory 44, controls the communication unit 4 to transmit the acquired flow definition to the information apparatus that transmits the acquisition instruction, and finishes the information processing illustrated in FIG. 7.

While the information processing apparatus 10, for example, deletes the processed document from the non-volatile memory 44 in a case where the information processing apparatus 10 receives the confirmation notification, the timing of deleting the processed document is not limited to such an example.

The user may not notify the confirmation notification because of the effort even in a case where the user satisfies the quality of the delivered processed document. In this case, the processed document is not deleted. Thus, unnecessary processed documents reduce the capacity of the non-volatile memory 44. Accordingly, the CPU 41 may delete the processed document having the same process ID as the process ID associated with the delivered representative document from the non-volatile memory 44 in a case where a preset period elapses from the delivery of the representative document. The period for starting deletion is set by the flow definition.

According to the information processing system 100 according to the exemplary embodiment, the information processing apparatus 10 generates a plurality of processed documents of different quality by performing the flow once. Thus, even in a case where the quality of the representative document does not satisfy the quality requested by the user, the processed document that satisfies the quality requested by the user is provided without executing the flow again on the document using another parameter value.

Modification Example 1 of Exemplary Embodiment

In the exemplary embodiment, the operation of the information processing apparatus 10 is described using an example of selecting one plug-in for the process of the processing part 15 using the flow definition and changing the parameter value of one parameter among parameters included in the plug-in.

The operation of the information processing apparatus 10 will be illustratively described using an example of selecting one plug-in as the process of the processing part 15 using the flow definition and changing the parameter value of each of a plurality of parameters included in the plug-in. Specifically, the OCR process is executed by changing the parameters of the "noise removal", the "analysis preprocessing", and the "analysis accuracy". The priority level of each of the parameter values of the "noise removal", the "analysis preprocessing", and the "analysis accuracy" is the same as the priority level illustrated in FIG. 3. The priority level of the parameter value is set by the flow definition created by the manager.

Furthermore, in the case of the present modification example, it is assumed that the priority level is predefined by the flow definition for not only the parameter value but also the parameter. Setting of the priority level of the parameter is not restricted. It is illustratively assumed that the priority level of the parameter is set to be increased in an order of "noise removal">"analysis preprocessing">"analysis accuracy".

Figure 8:
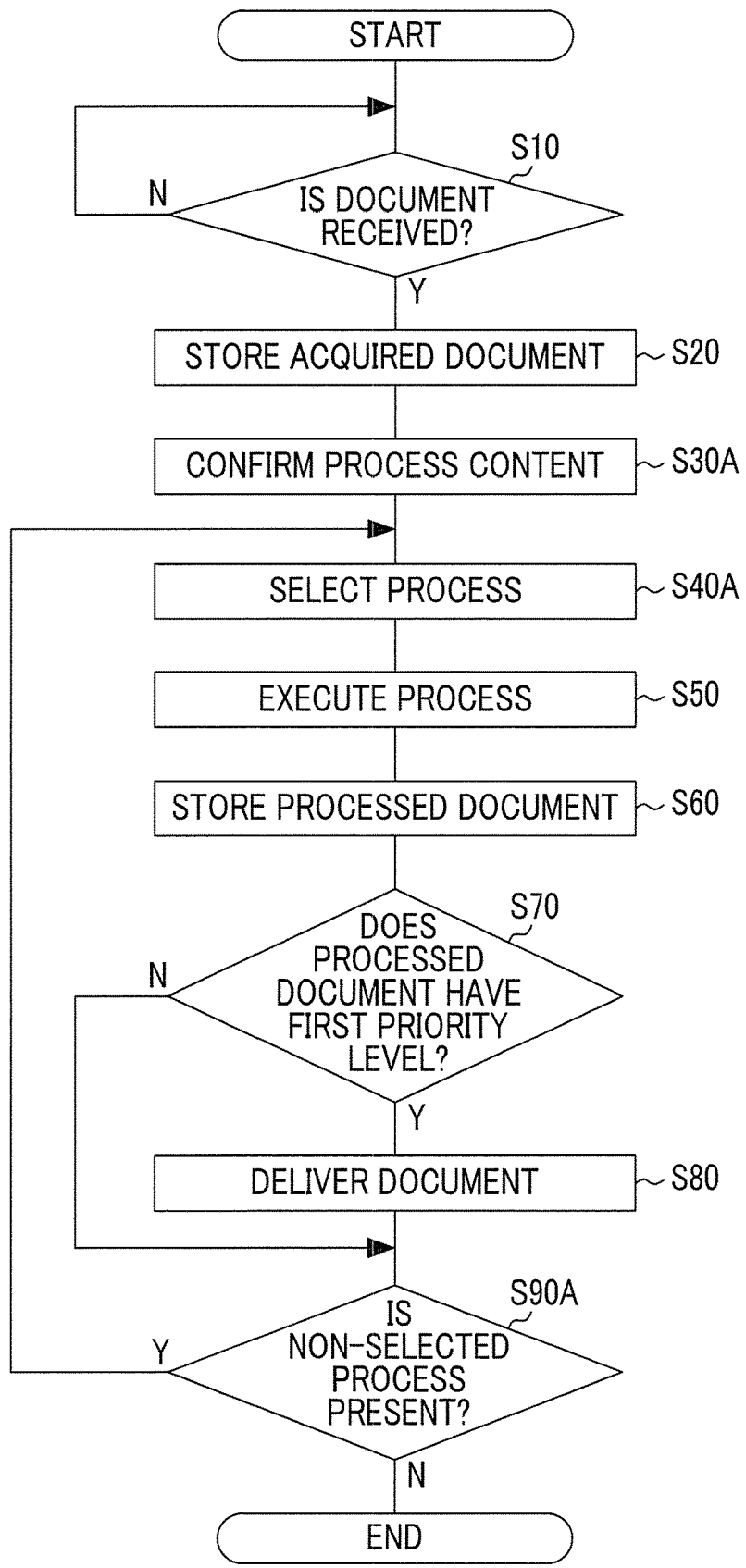
FIG. 8 is a flowchart illustrating another example of the flow of information processing executed after start-up.

FIG. 8 is a flowchart illustrating one example of a flow of information processing executed by the CPU 41 in a case where the information processing apparatus 10 is started up.

The flowchart illustrated in FIG. 8 is different from the flowchart illustrated in FIG. 6 in that steps S30, S40, and S90 are replaced with steps S30A, S40A, and S90A, respectively. Other processes are the same as those in the flowchart in FIG. 6.

In step S20, the process ID and the input document are associated with each other and are stored in the non-volatile memory 44. Then, step S30A is executed.

In step S30A, the CPU 41 generates a process table summarizing the process content to be executed on the input document from the flow definition associated with the flow definition ID using the flow definition ID associated with the flow being executed.

In this case, the process table illustrated in FIG. 9 is created from a combination of the parameter and the parameter value of each parameter in the OCR process. While each process included in the process table is associated with the priority level, the priority level associated with each process is a priority level that is set by combining the priority level of the parameter in the OCR process with the priority level of the parameter value of each parameter.

The first priority levels of the "noise removal", the "analysis preprocessing", and the "analysis accuracy" are "normal", "perform", and "speed priority", respectively. Thus, a process complying with the parameter values has the first priority level. Meanwhile, the "analysis accuracy" is the parameter having the lowest priority level. Thus, a process in which the parameter value of each of the "noise removal" and the "analysis preprocessing" is not changed, and the parameter value of the "analysis accuracy" is changed to "recognition ratio priority" having the second priority level, that is, (noise removal, analysis preprocessing, analysis accuracy)=(normal, perform, recognition ratio priority), has the second priority level. The expression "(noise removal, analysis preprocessing, analysis accuracy)=(normal, perform, recognition ratio priority)" represents that the parameter value of the "noise removal" is equal to "normal", the parameter value of the "analysis preprocessing" is equal to "perform", and the parameter value of the "analysis accuracy" is equal to "recognition ratio priority".

In such a manner, each process represented by a combination of the parameter and the parameter value of each parameter is associated with first to twelfth priority levels by considering the priority level of each of the parameter and the parameter value. The priority level associated with each process in step S30A corresponds to the priority level of the processed document.

In step S40A, the CPU 41 selects any one process from the process table generated in step S30A. Specifically, the CPU 41 makes a selection in order from the process having the highest priority level. The selection order of processes is not restricted. For example, a selection may be made in order from the process having the lowest priority level, or the process may be randomly selected.

In step S90A, the CPU 41 determines whether or not a process that is not selected in step S40A is present in the process table generated in step S30A. In a case where a process that is not selected is present, a transition is made to step S40A, and the non-selected process is selected in step S40A. In a case where it is determined that all processes included in the process table are selected in the determination process of step S90A, the information processing illustrated in FIG. 8 is finished.

While an example of setting the priority level of the parameter value up to the third priority level is illustratively described, the number of priority levels for the parameter value may be set by the flow definition for each information processing apparatus 10, each flow definition ID, each plug-in, or each parameter of each plug-in.

For example, while the priority level of each parameter value in the plug-in of the OCR process is up to the third priority level, the priority level of each parameter value in the plug-in of the barcode reading process may be set up to the fifth priority level.

In addition, the process order of parameters may be set by the flow definition for each information processing apparatus 10 or each flow definition ID. For example, in a case where the flow definition ID is different for the same plug-in, a different priority level may be set for each parameter. Accordingly, the process order is different among parameters.

In such a manner, by executing the flow once, the information processing apparatus 10 according to the present modification example generates a plurality of processed document of different quality complying with each process content regulated by a combination of the parameter and the parameter value of each parameter. In addition, the information processing apparatus 10 delivers the representative document to the delivery destination apparatus 30 among the plurality of generated processed documents.

Modification Example 2 of Exemplary Embodiment

In Modification Example 1 of the exemplary embodiment, the operation of the information processing apparatus 10 is described using an example of selecting one plug-in for the process of the processing part 15 using the flow definition and changing the parameter value of each of a plurality of parameters included in the plug-in.

The operation of the information processing apparatus 10 will be illustratively described using an example of selecting a plurality of plug-ins as the process of the processing part 15 using the flow definition and changing the parameter value of at least one parameter included in each plug-in Specifically, the operation of the information processing apparatus 10 will be described using the flow definition that is represented by the flow definition ID of "0001" in FIG. 3.

In the case of the present modification example, it is assumed that the priority level is predefined by the flow definition for not only the parameter and the parameter value of each parameter but also the plug-in. Setting of the priority level of the plug-in is not restricted. For example, it is assumed that the priority level of the plug-in is set to be increased in an order of "OCR process">"barcode reading process">"blank determination process". In addition, it is illustratively assumed that the priority level is set to be increased in an order of "noise removal">"analysis preprocessing">"analysis accuracy" for each parameter of the OCR process, and the priority level is set to be increased in an order of "noise removal">"analysis accuracy" for each parameter of the barcode reading process.

In the present modification example, a flowchart of information processing executed by the CPU 41 is the same as the flowchart illustrated in FIG. 8.

However, the process table generated by the CPU 41 in step 330A is different. In the case of the flow definition represented by the flow definition ID of "0001", the process table is generated by combining the plug-in, the parameter in each plug-in, and the parameter value of each parameter.

FIG. 10 is a diagram illustrating one example of the process table generated from the flow definition represented by the flow definition ID of "0001". Each process included in the process table is associated with a priority level that is set from the priority level of the plug-in, the priority level of the parameter in each plug-in, and the priority level of the parameter value of each parameter.

The OCR process includes three parameters. Three parameter values are set for one parameter. Two parameter values are set for each of the remaining two parameters. The barcode reading process includes two parameters. Three parameter values are set for one parameter. Two parameter values are set for the other parameter. The blank determination process includes one parameter. Three parameter values are set for the parameter. Accordingly, the process table includes a plurality of processes generating 216 processed documents of different quality associated with the first to 216-th priority levels.

While an example of performing processes in an order of the OCR process, the barcode reading process, and the blank determination process is illustratively described, the process order of plug-ins may be set by the flow definition for each information processing apparatus 10 or each flow definition ID.

For example, in a case where the priority level of the plug-in is set to be increased in an order of "barcode reading process", "OCR process">"blank determination process" in a flow definition associated with a different flow definition ID, the processed document in the other flow definition is generated in a different order from the process order described above.

In such a manner, by executing the flow once, the information processing apparatus 10 according to the present modification example generates a plurality of processed document of different quality complying with each process content regulated by a combination of the plug-in, the parameter in each plug-in, and the parameter value of each parameter. In addition, the information processing apparatus delivers the representative document to the delivery destination apparatus 30 among the plurality of generated processed documents.

Modification Example 3 of Exemplary Embodiment

While a case where the information processing apparatus 10 receives one document from the device 20 is described in the exemplary embodiment and Modification Example 1 and Modification Example 2 of the exemplary embodiment, a plurality of documents may be received depending on situations.

The operation of the information processing apparatus 10 in a case where the information processing apparatus 10 receives documents from the device 20 at the same time in two flows complying with the same flow definition will be illustratively described. The following description is also applied to a case where three or more documents are received from the device 20. The expression "receives documents at the same time" means that a plurality of documents are received at an interval such that collectively processing the documents has a higher processing efficiency than individually processing each document. The interval is obtained in advance by experiment on an actual apparatus of the information processing apparatus 10, computer simulation based on the design specifications of the information processing apparatus 10, or the like.

For easy understanding of description, it is illustratively assumed that in the flow definition, the OCR process is defined as the process to be executed on the document by the processing part 15, and only a process of changing the parameter value of the "noise removal" among parameters included in the OCR process is performed.

In the present modification example, a flowchart of information processing executed by the CPU 41 is the same as the flowchart illustrated in FIG. 8. The priority level of each parameter value of the "noise removal" in the OCR process is the same as the priority level illustrated in FIG. 3.

In a case where two documents are received at the same time in step S10, the process ID that corresponds to each flow receiving the document is associated with each document in step S20. Hereinafter, the two documents will be referred to as "document 1" and "document 2" in order of reception in step S10.

In a case where the process table for each document is generated in accordance with the flow definition in step S30A, the CPU 41 in step S40A selects any one process from the process table such that the processed documents of "document 1" and "document 2" are generated in accordance with a preset generation order.

The generation order of documents is defined by the flow definition. Thus, different generation order of documents are set depending on the content of the definition.

For example, the process may be selected in reception order of documents in step S10 and in order from the process having the highest priority level in the process table, and the document may be switched in order each time the processed document is generated by the process corresponding to the selected priority level. Hereinafter, the generation order of documents will be called "pattern 1".

FIG. 11 is a diagram illustrating one example of the generation order of processed documents generated by the information processing in FIG. 8 in accordance with pattern 1.

Regarding the parameter value of the "noise removal" of the OCR process, the first priority level is "normal". The second priority level is "strong". The third priority level is "weak". Thus, in pattern 1, the process of the first priority level having the strength of the noise removal set to "normal" is performed on document 1 that is received earlier. Next, the process of the first priority level having the strength of the noise removal set to "normal" is performed on document 2 that is received later. Then, the process of the second priority level having the strength of the noise removal set to "strong" is performed on document 1.

The generation order of documents illustrated in FIG. 11 is obtained by performing the process in reception order of documents and, each time the processed document is created, generating the processed document in order from the processed document corresponding to the process of the highest priority level while switching the received document in order.

That is, the processed document is generated in an order of "document 1 on which the process having the first priority level is executed"→"document 2 on which the process having the first priority level is executed"→"document 1 on which the process having the second priority level is executed"→"document 2 on which the process having the second priority level is executed"→"document 1 on which the process having the third priority level is executed"→"document 2 on which the process having the third priority level is executed".

As another generation order of documents, for example, the process may be selected in reception order of documents in step S10 and in order from the process having the highest priority level in the process table. The document may be switched in order after the processes of all priority levels included in the process table are selected. Hereinafter, the generation order of documents will be called "pattern 2".

FIG. 12 is a diagram illustrating one example of the generation order of processed documents generated by the information processing in FIG. 8 in accordance with pattern 2.

In pattern 2, the process of the first priority level having the strength of the noise removal set to "normal" is performed on document 1 that is received earlier. Next, the process of the second priority level having the strength of the noise removal set to "strong" is performed on document 1, and the process having the lowest priority level (in this case, the process having the strength of the noise removal set to "weak") is performed on document 1. Then, the processes in generation order applied to document 1 are performed on document 2.

The generation order of documents illustrated in FIG. 12 is obtained by generating the processed document in reception order of documents and in order from the processed document corresponding to the process having the highest priority level.

That is, the processed document is generated in an order of "document 1 on which the process having the first priority level is executed"→"document 1 on which the process having the second priority level is executed"→"document 1 on which the process having the third priority level is executed"→"document 2 on which the process having the first priority level is executed"→"document 2 on which the process having the second priority level is executed"→"document 2 on which the process having the third priority level is executed".

In addition, as another generation order of documents, for example, the process may be selected in reception order of documents in step S10 and in order from the process having the lowest priority level in the process table. The document may be switched in order after the processes of all priority levels included in the process table are selected. Hereinafter, the generation order of documents will be called "pattern 3".

FIG. 13 is a diagram illustrating one example of the generation order of processed documents generated by the information processing in FIG. 8 in accordance with pattern 3.

In pattern 3, the process of the third priority level having the strength of the noise removal set to "weak" is performed on document 1 that is received earlier. Next, the process of the second priority level having the strength of the noise removal set to "strong" is performed on document 1, and the process having the highest priority level (in this case, the process having the strength of the noise removal set to "normal") is performed on document 1. Then, the processes in generation order applied to document 1 are performed on document 2.

The generation order of documents illustrated in FIG. 13 is obtained by generating the processed document in reception order of documents and in order from the processed document corresponding to the process having the lowest priority level.

That is, the processed document is generated in an order of "document 1 on which the process having the third priority level is executed"→"document 1 on which the process having the second priority level is executed"→"document 1 on which the process having the first priority level is executed"-"document 2 on which the process having the third priority level is executed"→"document 2 on which the process having the second priority level is executed"→"document 2 on which the process having the first priority level is executed".

Furthermore, as another generation order of documents, the process may be performed in order from the process corresponding to the setting of the parameter value having the shortest process time in the plug-in, and the process corresponding to the setting of the parameter value having the longest process time may be performed at last. Hereinafter, the generation order of documents will be called "pattern 4".

FIG. 14 is a diagram illustrating one example of the generation order of processed documents generated by the information processing in FIG. 8 in accordance with pattern 4. The process time for each parameter value in the "noise removal" of the OCR process is set to be increased in an order of "strong">"normal">"weak". The process time in the plug-in is obtained in advance by experiment on the actual apparatus of the information processing apparatus 10, computer simulation based on the design specifications of the information processing apparatus 10, or the like.

In pattern 4, the process that has the shortest process time and has the strength of the noise removal set to "weak" is performed on document 1 that is received earlier, and the process is performed on document 2 without changing the setting of the parameter value of the noise removal. Next, the process that has the strength of the noise removal set to "normal" is performed on document 1, and the process is performed on document 2 without changing the setting of the parameter value of the noise removal. Last, the process that has the longest process time and has the strength of the noise removal set to "strong" is performed on document 1, and the process is performed on document 2 without changing the setting of the parameter value of the noise removal.

The generation order of documents illustrated in FIG. 14 is obtained by generating the processed document in order from the processed document corresponding to the process having the shortest process time. The processed document may be generated in order from the processed document corresponding to the process having the longest process time in opposition to the generation order of documents illustrated in FIG. 14.

The generation order in which the processed document is initially generated from document 1 is illustrated in the example in FIG. 14. However in the case of pattern 4, the generation order of documents is determined by the length of the process time regardless of the reception order of documents. Accordingly, the process that has the strength of the noise removal set to "weak" may be performed on document 2 earlier than document 1. In the case of performing the same process on a plurality of documents, the process time tends to be decreased as the data size of the document is decreased. Accordingly, the data size of each of document 1 and document 2 may be compared, and the process may be started from the document having a smaller data size.

In a case where processes complying with the parameter values of a plurality of parameters are set to be executed in the flow definition, and a case where processes of a combination of a plurality of plug-ins are set to be executed in the flow definition, the processed document may be generated by prioritizing the process in which the parameter value of each parameter in each plug-in is combined to have a short overall process time from the start of the processing of the document until generation of the processed document, and the process in which the parameter value of each parameter in each plug-in is combined to have the longest overall process time may be performed at last.

Any process order that is to be used among the process orders illustrated in pattern 1 to pattern 4 is set by the flow definition for each information processing apparatus 10 or each flow definition ID. For example, in a case where the flow definition ID is different for the same process content, the process order in a case where a plurality of documents are received may be different.

While the invention is described thus far using the exemplary embodiment, the invention is not limited to the scope disclosed in the exemplary embodiment. Various modifications or improvements can be made to the exemplary embodiment without departing from the nature of the invention, and exemplary embodiments to which such modifications or improvements are made also fall within the technical scope of the invention. For example, the order of processes may be changed without departing from the nature of the invention.

In addition, while software implementation of the information processing illustrated in FIG. 6 to FIG. 8 is illustratively described in the exemplary embodiment, a process that is equivalent to the flowcharts illustrated in FIG. 6 to FIG. 8 may be implemented in, for example, an application specific integrated circuit (ASIC) and may be processed by hardware. In this case, the speed of the process is increased, compared to that in a case where the information processing is implemented by software.

In addition, while installation of the information processing program in the ROM 42 is described in the exemplary embodiment, the invention is not limited thereto. The information processing program according to the exemplary embodiment may be provided as a record on a computer readable storage medium. For example, the information processing program according to the exemplary embodiment may be provided as a record on an optical disc such as a compact disc (CD)-ROM or a Digital Versatile Disc (DVD)-ROM. In addition, the information processing program according to the exemplary embodiment may be provided as a record in a semiconductor memory such as a USB memory and a flash memory. Furthermore, the information processing apparatus 10 may acquire the information processing program according to the exemplary embodiment through the communication line 2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a generation part that generates a plurality of documents of different quality from an input document input in a process in accordance with each of a plurality of attribute values in a case where the plurality of attribute values designating quality of a document to be generated by the process are set for an attribute regulating operation of the process included in a preset process procedure;
   a control part that performs a control for retaining the plurality of documents generated by the generation part in a storage device; and
   an output part that outputs any one document as a representative document among the plurality of documents generated by the generation part and, in a case where an output request for a document different from the output document is received, outputs a document having quality designated by the output request among the plurality of documents retained in the storage device by the control part, wherein in a case where a response that indicates that the document output by the output part is a document having the designated quality is received,
the control part performs a control for deleting the plurality of documents from the storage device,
wherein even in a case where the response is not received, the control part performs the control for deleting the plurality of documents from the storage device after an elapse of a preset period from the output of the representative document by the output part.

2. The information processing apparatus according to claim 1,
wherein a priority level that represents a priority of the attribute value is set for the plurality of attribute values,
the generation part generates the plurality of documents using the priority level, and
the output part outputs a document having the highest priority level as the representative document among the plurality of documents associated with the priority level used in the generation.

3. The information processing apparatus according to claim 2,
wherein the generation part performs the generation in order from a document corresponding an attribute value having the highest priority level among the plurality of attribute values.

4. The information processing apparatus according to claim 3, further comprising:
a setting part that sets the number of settings of the priority level in the process.

5. The information processing apparatus according to claim 2,
wherein the generation part performs the generation in order from a document corresponding an attribute value having the lowest priority level among the plurality of attribute values.

6. The information processing apparatus according to claim 5, further comprising:
a setting part that sets the number of settings of the priority level in the process.

7. The information processing apparatus according to claim 2,
wherein in a case where a plurality of the input documents for the process are present,
the generation part generates the plurality of documents generated from each input document in accordance with a preset generation order.

8. The information processing apparatus according to claim 7,
wherein the generation part generates the plurality of documents generated from each input document in a reception order of the process and in order from a document corresponding to an attribute value having the highest priority level among the plurality of attribute values while switching the input document which is a generation source of the document in order each time the document is generated from the input document.

9. The information processing apparatus according to claim 8, further comprising:
a setting part that sets the number of settings of the priority level in the process.

10. The information processing apparatus according to claim 7,
wherein the generation part generates the plurality of documents for each input document in a reception order of the input document and in order from a document corresponding to an attribute value having the highest priority level among the plurality of attribute values.

11. The information processing apparatus according to claim 7,
wherein the generation part generates the plurality of documents for each input document in a reception order of the input document and in order from a document corresponding to an attribute value having the lowest priority level among the plurality of attribute values.

12. The information processing apparatus according to claim 7, further comprising:
a setting part that sets the number of settings of the priority level in the process.

13. The information processing apparatus according to claim 2, further comprising:
a setting part that sets the number of settings of the priority level in the process.

14. The information processing apparatus according to claim 13,
wherein the setting part sets the number of settings of the priority level for each information processing apparatus, each process procedure, each process, or each attribute of the process.

15. The information processing apparatus according to claim 13,
wherein the setting part further sets a process order of the process for each information processing apparatus or each process procedure.

16. The information processing apparatus according to claim 13,
wherein the setting part further sets a priority level among attributes of the process.

17. The information processing apparatus according to claim 16,
wherein the generation part generates a document in accordance with a priority level of the plurality of documents that is set using a combination of the priority level among the attributes of the process and the priority levels set for the attribute values of the attribute.

18. A non-transitory computer readable medium storing an information processing program causing a computer to function as each part of the information processing apparatus according to claim 1.

* * * * *